(12) United States Patent
Rogalski

(10) Patent No.: US 9,193,129 B2
(45) Date of Patent: Nov. 24, 2015

(54) COMPOSITE JOINING SYSTEM AND METHOD

(71) Applicant: The Boeing Company, Chicago, IL (US)

(72) Inventor: Mark E. Rogalski, Sammamish, WA (US)

(73) Assignee: The Boeing Company, Chicago, IL (US)

(*) Notice: Subject to any disclaimer, the term of this patent is extended or adjusted under 35 U.S.C. 154(b) by 350 days.

(21) Appl. No.: 13/679,125

(22) Filed: Nov. 16, 2012

(65) Prior Publication Data

US 2014/0141234 A1    May 22, 2014

(51) Int. Cl.
| | |
|---|---|
| *B32B 3/18* | (2006.01) |
| *B29C 65/48* | (2006.01) |
| *B29C 65/52* | (2006.01) |
| *B29C 65/00* | (2006.01) |
| *B29L 31/30* | (2006.01) |

(52) U.S. Cl.
CPC ............ *B32B 3/18* (2013.01); *B29C 65/483* (2013.01); *B29C 65/486* (2013.01); *B29C 65/526* (2013.01); *B29C 66/1122* (2013.01); *B29C 66/45* (2013.01); *B29C 66/721* (2013.01); *B29C 66/72141* (2013.01); *B29C 66/73751* (2013.01); *B29L 2031/3076* (2013.01); *Y10T 428/249997* (2015.04)

(58) Field of Classification Search
CPC ...... B32B 3/18; B29C 65/483; B29C 65/486; B29C 65/526; B29C 66/45; B29C 66/721
USPC ............................ 428/201, 297.4, 321.5, 352
See application file for complete search history.

(56) References Cited

U.S. PATENT DOCUMENTS

| | | | |
|---|---|---|---|
| 4,609,208 A * | 9/1986 | Wrobel | ........................ 283/81 |
| 7,108,914 B2 | 9/2006 | Skipor | |
| 2002/0134500 A1* | 9/2002 | Wells et al. | .................. 156/277 |
| 2011/0003137 A1 | 1/2011 | Cosentino | |
| 2015/0056433 A1* | 2/2015 | MacAdams et al. | .......... 428/221 |

* cited by examiner

*Primary Examiner* — Betelhem Shewareged
(74) *Attorney, Agent, or Firm* — Walters & Wasylyna LLC

(57) ABSTRACT

A joining surface formed of a composite structure having at least one ply and a peel ply cured to an outer surface of the composite structure, the peel ply including a plurality of microcapsules each filled with a joining material, wherein upon removal of the peel ply from the outer surface of the composite structure, the microcapsules fracture and release the resin to form an uncured surface for joining.

18 Claims, 5 Drawing Sheets

COMPOSITE JOINING SYSTEM AND METHOD

FIELD

The present disclosure is generally related to composite joining and, more particularly, to a joining surface and method formed of a composite including a peel ply having a plurality of exposable microcapsules, which upon fracturing release a resin for joining to an adjacent material.

BACKGROUND

Joining of an uncured secondary material to an existing cured composite typically requires large assemblies and relatively thick and/or thin individual composite parts, which may then be joined together. This joining method may provide a weaker, secondary joint, which may be difficult to validate for strength and durability using standard detection methods. A reoccurring problem in such secondary joining is that the secondary bond may not be completely laminated or may be a weak bond and the compounded structure may tend to fail or degrade due to mechanical fatigue, impact, or aging. This problem is of great concern due to the widespread use of composite materials used in the aerospace industry. Existing solutions include hand sanding to form an abraded surface, using a dry peel ply, as well as multi-stage curing processes or secondarily bonded assemblies, which may require specific time controls and additional adhesives to secure the bond.

Accordingly, those skilled in the art continue with research and development efforts in the field of composite joining to improve joining of uncured materials to cured composite structures.

SUMMARY

In one embodiment, the disclosed composite joining system may include a composite structure having at least one ply and a peel ply cured to an outer surface of the composite structure, the peel ply including a plurality of microcapsules each filled with a joining material (e.g., resin), wherein upon removal of the peel ply from the outer surface of the composite structure, the microcapsules fracture and release the joining material to form an uncured surface for joining.

In another embodiment, the disclosed composite joining system may include a composite structure having at least one ply and a peel ply cured to an outer surface of the composite structure, the composite structure including a plurality of microcapsules below the outer surface, wherein each microcapsule is filled with a resin, wherein upon removal of the peel ply from the outer surface of the composite structure, the microcapsules fracture and release the resin to form an uncured surface for joining.

In another embodiment, the disclosed composite joining system may include a composite structure having at least one ply including a plurality of reinforcement fibers embedded with a matrix and a plurality of microcapsules each filled with a resin, wherein upon preparation of an outer surface of the composite structure, the microcapsules fracture and release the resin to form an uncured surface for joining.

In yet another embodiment, disclosed is a method of forming a joining surface comprising the steps of: (1) assembling a composite structure having at least one ply and a peel ply, the peel ply including a plurality of microcapsules each filled with a resin, (2) removing the peel ply from the composite structure, and (3) fracturing the plurality of microcapsules to release the resin and form an uncured surface for joining.

Other aspects of the disclosed composite joining system and method will become apparent from the following detailed description, the accompanying drawings and the appended claims.

DETAILED DESCRIPTION

Figure 1:
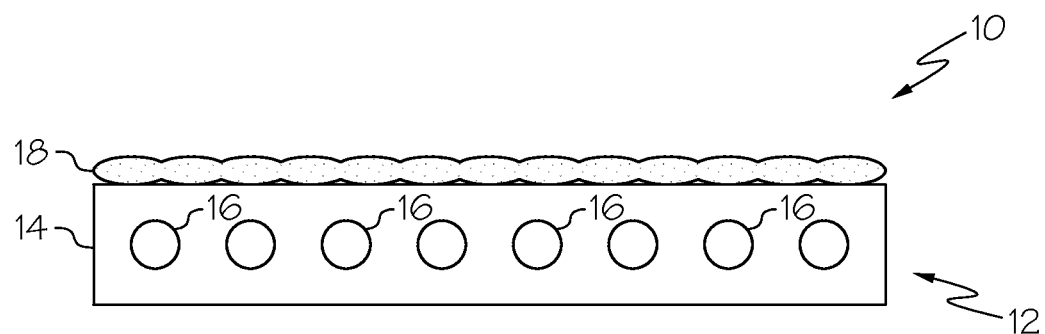
FIG. 1 is a cross-sectional view of a composite structure of one embodiment of the disclosed joining surface.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
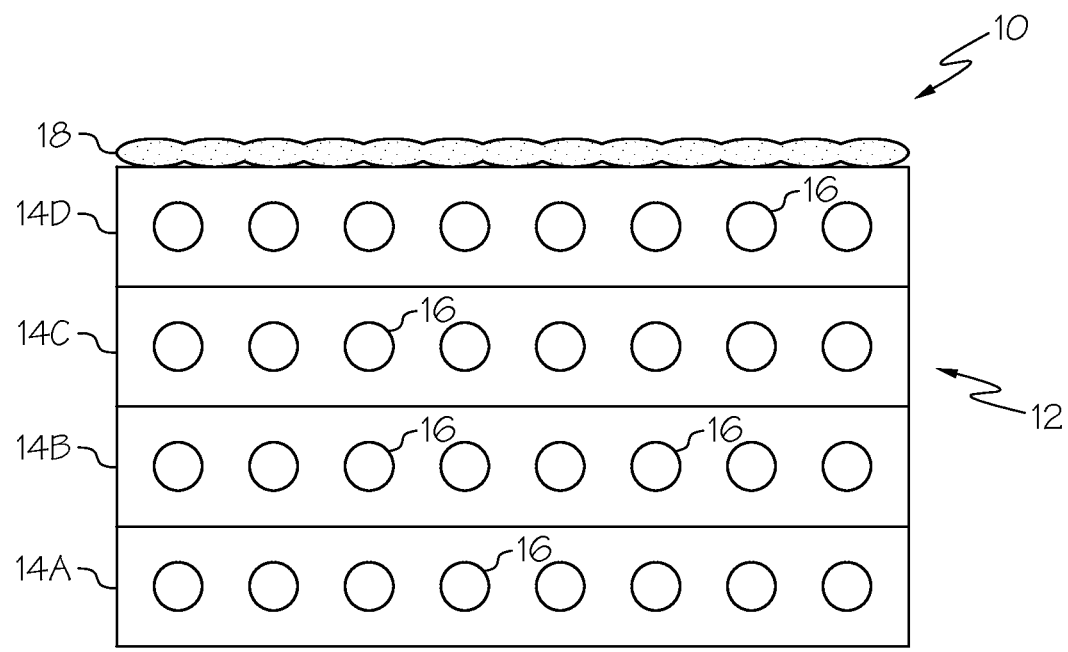
FIG. 2 is a cross-sectional view of a composite structure of another embodiment of the disclosed joining surface.

Referring to FIGS. 1 and 2, a self-joining composite, generally designated 10, may include a composite structure 12 made up of constituent materials. The composite structure 12 may be formed of a single ply 14 (FIG. 1) or may be a laminate formed by a stacked assembly of a plurality of plies 14 (FIG. 2). Each ply 14 may be a composite material having a plurality of reinforcement fibers 16 embedded within a matrix. As one alternative, the ply 14 may include a tape (or other reinforcing material) rather than fibers 16. As another alternative, the ply 14 may be a hybrid that includes both reinforcing fibers 16 and reinforcing tape (or other reinforcing material).

For example, a single ply 14 may include fibers 16 oriented in a single direction (i.e., unidirectional) or in two directions (i.e., bidirectional; for example a woven fabric). As shown in FIG. 1, for clarity of illustration, the fibers 16 of the single ply 14 are shown in a single direction. Furthermore, as shown in FIG. 2, for ease of illustration, the fibers 16 of each of the plurality of plies 14 of the stacked composite structure 12 is shown in a single direction; however, it can be appreciated by one skilled in the art that in practice the direction of the fibers can vary throughout the stack of plurality of plies 14 to give desired mechanical properties to the composite structure 12. The stacked composite material 12 may have any number of plies 14 laid and cured in a stacking sequence.

The fibers 16 may run parallel (uni/longitudinal, 0°), circumferential (bi-axial, 90°) or helical (biased, ±33° to 45°) along the length of the part, or with random continuous strands. Strands can also be varied, producing a virtually isotropic laminate with equal strength in all directions. For example, the composite structure 12 illustrated in FIG. 2 may be a laminate having four plies (or lamina) 14A, 14B, 14C, 14D. The first ply 14A may have fibers 16 oriented longitudinally. The second ply 14B may have fibers 16 oriented forty-five degrees (45°) relative to the first ply 14A. The third ply 14C may have fibers oriented ninety degrees) (90°) relative to the first ply 14A. The fourth ply may have fiber oriented forty-five degrees) (45°) relative to the first ply 14A. It can be appreciated by one skilled in the art that while this symmetrical lay-up is typical for composite structures, other asymmetrical orientations may be used.

The composite structure 12 may be formed using any suitable manufacturing technique, including wet lay-up, spray-up, compression, injection, resin transfer, vacuum infusion, or similar methods. Alternatively, each ply 14 may be ready-to-mold sheet of fiber reinforcement that has been pre-impregnated with resin, i.e., prepreg.

Figure 3:
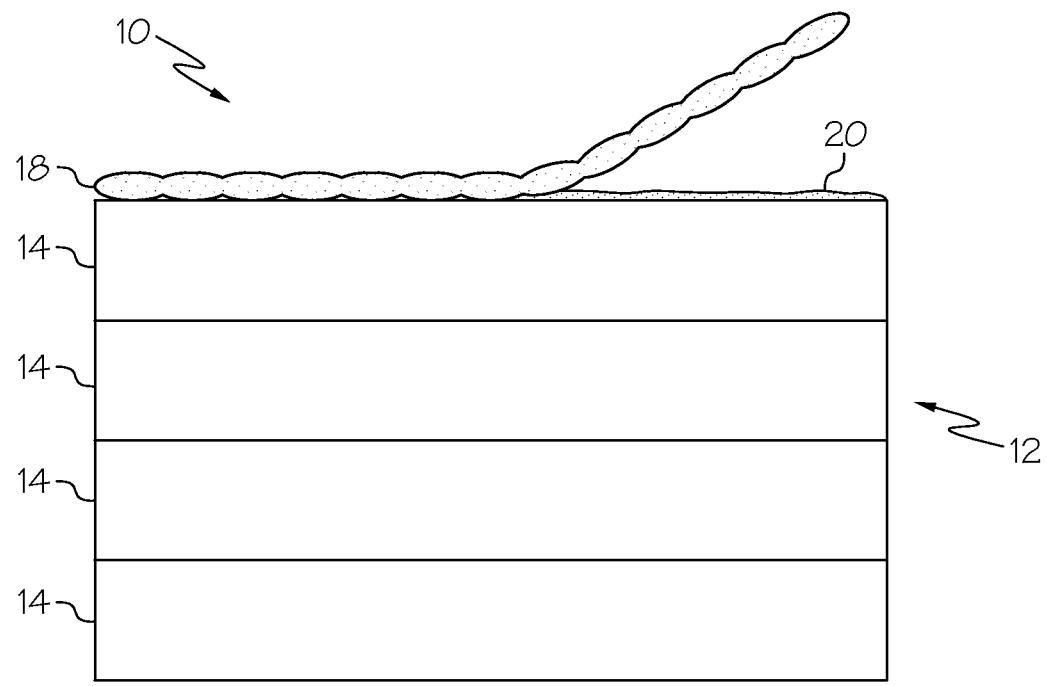
FIG. 3 is a side view of the composite structure of FIG. 2 depicting the peel ply being removed.
Figure 4:
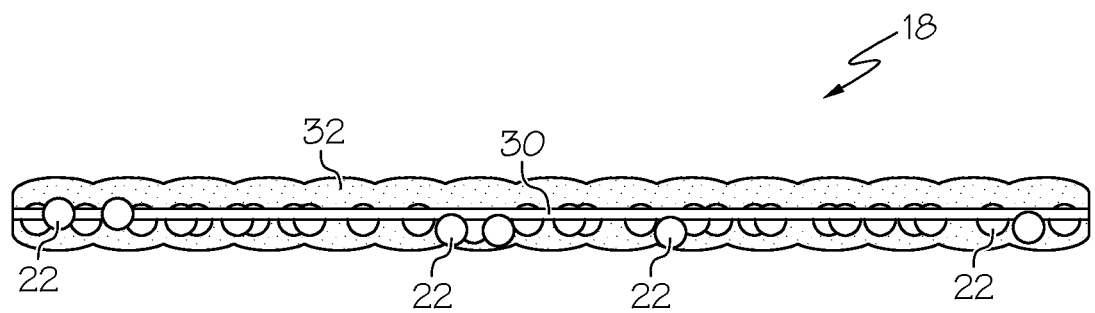
FIG. 4 is an enlarged cross-sectional view of a peel ply of the disclosed joining surface.
Figure 5:
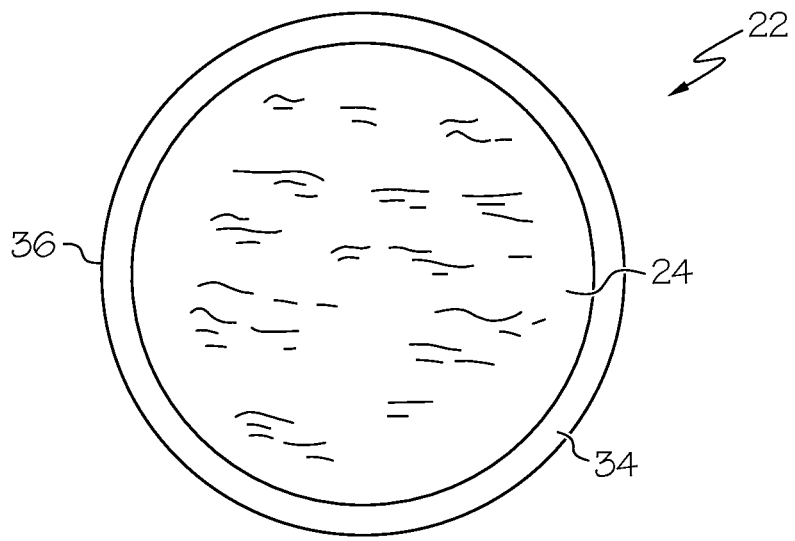
FIG. 5 is an enlarged cross-sectional view of a single microcapsule depicted in FIG. 3.

Referring next to FIGS. 3 through 5, a peel ply 18 may be applied to at least one surface of the composite structure 12. The peel ply 18 may be in the form of a fabric 30 and resin medium 32 applied and cured to the work surface 20 of the composite structure 12. One skilled in the art can recognize that any suitable fabric type may be utilized, such as woven, felted, or matted fabric. The peel ply 18 may eliminate the need for sanding or grit blasting, and may leave less or no residual fibers on the work surface 20 when removed.

The peel ply 18 may include a plurality of microcapsules 22 embedded within the fabric 30 and resin medium 32. Each microcapsule 22, also referred to as hollow microspheres, microbubbles or microballoons, may be small bodies having solid walls 34 fabricated to enclose a resin 24 or other flowable joining material that is polymerizable. As used herein, "resin" or broadly refers to any suitable joining material, whether or not a resin. A uniform dispersion or essentially uniform dispersion of the microcapsules 22 in a polymeric matrix of the peel ply 18 is generally preferred, but may not be required for all applications. The microcapsules 22 may be fabricated in various diameter ranges from several hundred micrometers or less. Microcapsules 22 of various sizes may be used in the same application. The external diameters of a given plurality of microcapsules 22 may have a size distribution range that depends on the application envisioned.

The thickness and brittleness of the walls 34 of the microcapsules 22 may be selected to be functionally sufficient for intentional fracturing upon removal of the peel ply 18 while precluding premature rupture under normally encountered compressive or tensile forces. It can be appreciated that wall thickness generally increases with increasing diameters of the microcapsules 22 and that the fracture strength of the microcapsules 22 generally will increase with increasing wall thickness. The microcapsules 22 may be generally spherical in shape, but other geometries may be utilized. The walls 34 of the microcapsules may be formed, for example, of thermoplastic resin, thermosetting resin, hydrous metal oxide, silica, borosilicates, silicate type sol-gel precursors, carbon, or polymers such as urea-formaldehyde or phenolics. Additionally, the walls 34 of the microcapsules 22 or some portion of microcapsule shell may be formed or partially formed of a material that additionally toughens the base polymer of the resin 24 when cured to maintain fracture toughness consistent with aerospace composite systems or other expected uses, such as Polyetherketoneketone (PEKK), Polyether ether ketone (PEEK), Polyamides, Polyethersulphone (PES), Polyimide (PI), Polyphenylene sulphide (PPS), Poly arylene ether, or Carboxyl-Terminated Acrylonitrile-Butadiene (CTBN) rubber.

The resin 24 may be any suitable liquid epoxy or other polymerizable material encapsulated within the microcapsules 22, which is stable when the peel ply 18 is cured or partially cured to the composite structure 12. The resin 24 may be any suitable monomer, oligomer, or combinations thereof. Optionally, small amounts of solvents may be incorporated to facilitate the flow of the resin 24 upon fracture of the microcapsules 22. The resin 24 may be a material having a viscosity permitting it to flow out of the microcapsules 22 under the expected use conditions of removing the peel ply 18 from the work surface 20 of the composite structure 12. The resin 24 may generally have a viscosity and rheological characteristics that permit it to flow at an expected operating temperature in which the peel ply 18 is used. Alternatively, the resin 24 may have characteristics that permit it to flow at increased temperatures during a curing or partial curing process. The resin 24 may be encapsulated inside the microcapsules 22 by suitable techniques presently known or that will be known for that general purpose.

Optionally, a solvent may be included inside the microcapsule 22 together (e.g., physically mixed) with the resin 24 in an amount effective to facilitate the flow of the resin 24 upon rupture or fracture of the microcapsule 22. When used, the solvent generally is selected to be a liquid or flowable material at the temperature at which the resin 24 is expected or designed to be used. The solvent, when used, preferably is chemically inert relative to the resin. Furthermore, the solvent may be selected such that the solvent does not affect the quality of the joined system.

Optionally, a polymerization agent may be attached to the outer surface 36 of the microcapsules 22. The polymerization agent may be a material that will induce or promote polymerization of the particular resin 24 or other polymerizable material enclosed within the microcapsules 22 when the resin 24 comes into contact with the polymerization agent, such as when the microcapsules 22 are ruptured by removal of the peel ply 18. The outer surface 36 of the microcapsules 22 may be the bare surface of the microcapsules 22 themselves, or, alternatively, the surface of a thin film coating or coatings that may be integrally applied upon the surface of the microcapsules 22. Alternatively, a polymerization agent may be encapsulated within a separate plurality of microcapsules, which also rupture upon removal of the peel ply 18 and mix with the resin 24 joining material.

Generally, the peel ply 18 may be shaped into desired shapes by any technology, including, for example, lamination, injection, extrusion, extrusion covering, film blowing, calendering, sheet thermoforming, blow molding, coating on a substrate, rotational molding, casting, compression molding, and transfer molding. The microcapsules 22 may be embedded within the peel ply 18 at any convenient time prior to hardening. As a practical matter, if used, the polymerization agent may be attached to the surfaces of the microcapsules 22 prior to the introduction of the microcapsules 22 into the peel ply 18. For example, the microcapsules 22 may be introduced during the compounding of the resin medium 32 with the fabric 30. If the peel ply 18 will be shaped into a desired geometry before hardening by a technology having high shear forces and the like associated with it, such as injection molding or extrusion, care should taken that the microcapsules 22 be engineered to tolerate the shaping conditions without prematurely rupturing.

Figure 6:
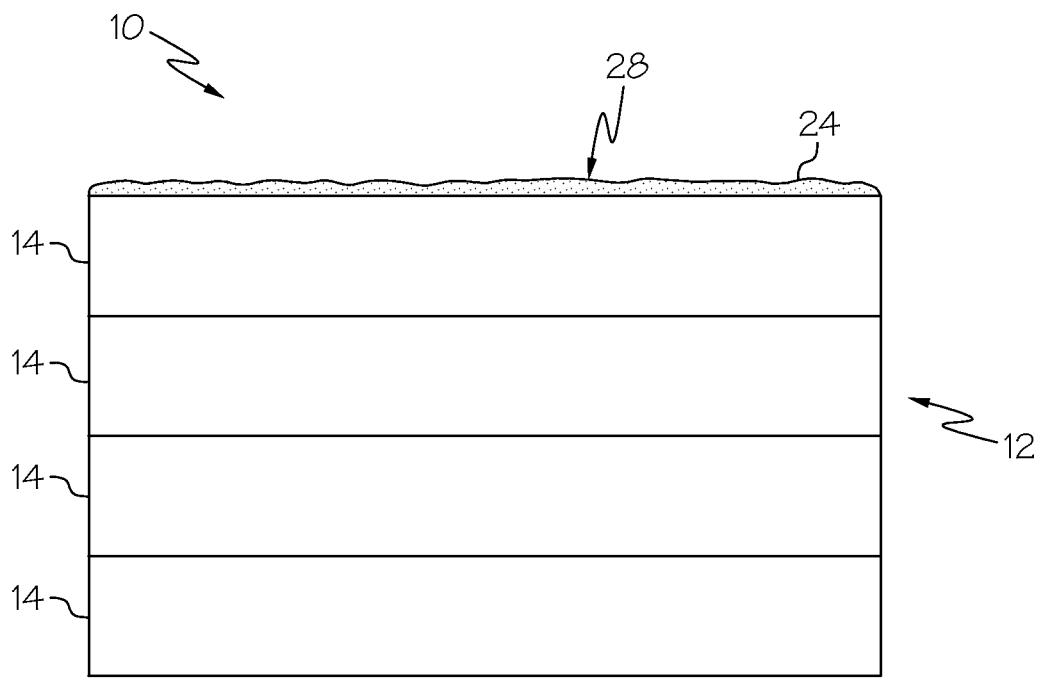
FIG. 6 is a side view of the composite structure of FIG. 2 depicting a resin rich work surface after the peel ply is removed.

Referring to FIGS. 3 and 6, after the composite structure 12 and peel ply 18 have been assembled (FIGS. 1 and 2), it may be cured or partially cured, for example in an autoclave. Upon removal of the peel ply 18 and rupture of the microcapsules 22, a large amount of uncured resin 24 remains on the work surface 20 of the composite structure 12 for joining of a secondary structure 26. Thus, upon removal of the peel ply 18, the work surface 20 of the composite structure 12 is left as a resin rich work surface 28, or joining surface, being a combination of a cured surface and an uncured surface, to which the secondary structure 26 may be joined without the need of adhesives.

Figure 7:
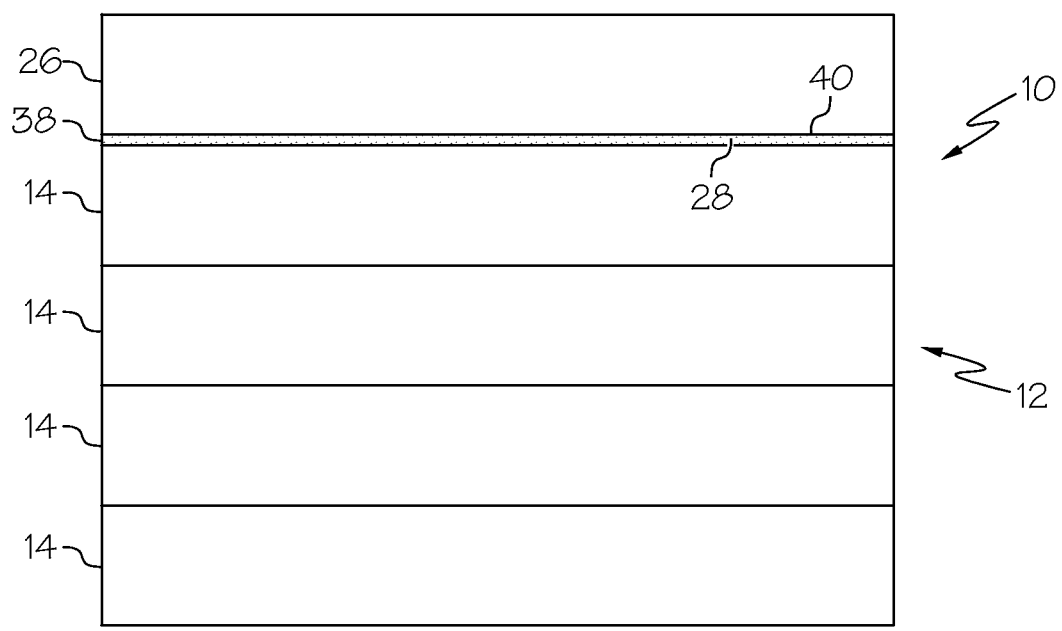
FIG. 7 is a side view of the composite structure of FIG. 2 with a secondary structure attached about the resin covered work surface.

Referring to FIG. 7, the secondary structure 26 may be an uncured, i.e., green, composite material, may be a work surface of a second composite structure, may be a resin rich work surface 28 of a second stacked composite structure 12 having its peel ply 18 removed, or may be an additional ply of composite material which allows a thick structure to be built up or otherwise assembled using uncured and cured laminate stack-up systems without the use of adhesives. In certain applications, the secondary structure 26 may be required to be a resin rich composite ply in order to achieve proper joining without the need for an adhesive. This method may provide control and balance of thermal exotherms during curing, which may cause thermal degradation in the final composite, and may reduce total curing time.

The resin rich work surface 28 may allow the work surfaces of the composite structure 12 and the secondary structure 26 to be joined together at a joint 38, which may allow the resin 24 to chemically mix and react to form a homogeneous interface. The homogeneous joint 38 may allow for standard through-transmission ultrasonic (TTU) inspection for void detection. TTU inspection is currently incapable of detecting a delamination or a weak bond due to intimate contact between two joined plies or substrates, i.e., kissing bonds. This deficiency may be overcome by the disclosed joining surface as the resin rich work surface 28 may provide a wet, i.e., uncured, surface to wet surface joined and cured structure, having similar characteristics to a co-cured composite.

Optionally, a veil 40 may be added to the compounded structure 42 (i.e., combined composite structure 12 and secondary structure 26). The veil 40 may be integrated between the resin rich work surface 28 of the composite structure 12 and a work surface 44 of the secondary structure 26 to become part of the joint 38. The veil 40 may be used to additionally toughen the infused structures 12, 26. The veil 40 may be a separate substrate or may be part of the secondary structure 26, for example a prepreg ply of composite material, which is adhered or cured to the resin rich work surface 28 of the composite structure 12.

Various implementations of the disclosed joining surface may be utilized to form the compounded structure 42. As an example, a single ply or multiply composite structure 12 with the peel ply 18 may be laid up and cured. When a secondary structure 26 is to be added to the composite structure 12, the peel ply 18 may be removed, i.e., pulled away, from the work surface 20 fracturing the plurality of microcapsules 22 and forming the resin rich work surface 28. The secondary structure 26 may then be joined to the resin rich work surface 28 and optionally cured to the composite structure 12 to form the compounded structure 44. As another example, two composite structures 12, each having a peel ply 18 may be laid up and optionally cured. The peel ply 18 of each composite structure 12 may be removed to create two opposing resin rich work surfaces 28 which are joined together to form the compounded structure 42. As yet another example, two composite structures 12, each having a peel ply 18 may be laid up and optionally cured. The peel ply 18 of each composite structure 12 may be removed to create two opposing resin rich work surfaces 28 which are joined together with an additional adhesive to form the compounded structure 42.

A benefit of the disclosed joining surface may be the ability to join secondary structures 26 of various dissimilar materials along the joint 38 by use of the resin rich work surface 28 created by the rupture of the microcapsules 22.

Figure 8:
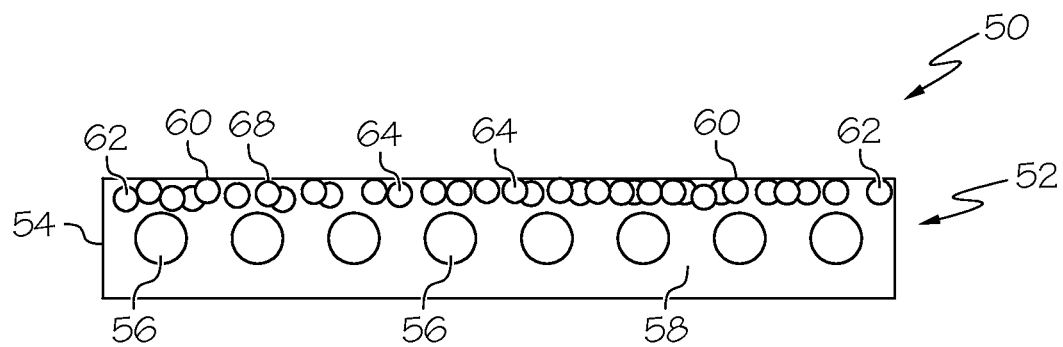
FIG. 8 is a cross-sectional view of a composite structure of another embodiment of the disclosed joining surface.

Referring next to FIG. 8, a self-joining composite, generally designated 50, may include a composite structure 52 made up of constituent materials. The composite structure 52 may be formed of a single ply 54 or may be a laminate formed by a stacked assembly of a plurality of plies 54, only a single ply 54 is shown by example. Each ply 54 may be a composite material having a plurality of reinforcement fibers 56 (or other reinforcing material) embedded within a matrix by a resin medium 58, for example a prepreg ply. The ply 54 may include a plurality of microcapsules 60 embedded within the resin medium 58. The microcapsule 60 may be small bodies having solid walls 62 fabricated to enclose a resin 64 or other flowable joining material. The thickness and brittleness of the walls 62 of the microcapsules 60 may be selected to be functionally sufficient for intentional fracturing while precluding premature rupture under normally encountered compressive or tensile forces or during initial curing of the composite structure 52.

The microcapsules 60 may be dispersed proximate (i.e., at or near) an outer surface 68 of the composite structure 52 to provide for intentional fracturing upon surface preparation of the outer surface 68. For example, a conventional peel ply may be cured to the outer surface 68, which upon removal will fracture the outer surface 68 and rupture the embedded microcapsules 60 to form a resin rich work surface to which a secondary structure may be joined. The peel ply may eliminate the need for sanding or grit blasting, and may leave less or no residual fibers on the work surface 20 when removed. As another example, the outer surface 68 of the composite structure 52 may be prepared by use of a laser, CO2 blasting, or an etching treatment to fracture the outer surface 68 and rupture the microcapsules 60.

Figure 9:
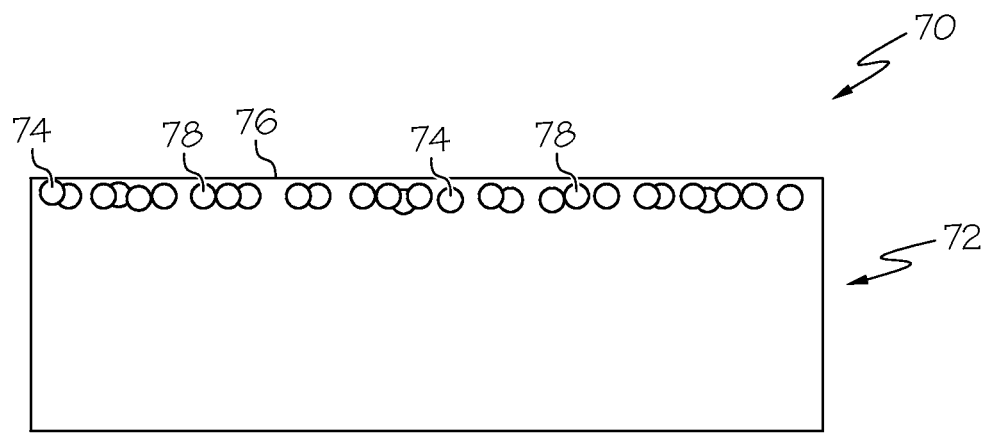
FIG. 9 is a cross-sectional view of a polymer structure of another embodiment of the disclosed joining surface.

Referring next to FIG. 9, a self-joining polymer, generally designated 70, may include a polymer structure 72 made up of constituent materials. The polymer structure 72 may include a plurality of microcapsules 74 embedded within and dispersed proximate an outer surface 76 of the polymer structure 72 to provide for intentional fracturing upon surface preparation. The microcapsule 74 may be small bodies having solid walls 78 fabricated to enclose a resin 78 or other flowable joining material, such as a joining material that is polymerizable. Upon a selected surface treatment, the outer surface 76 of the polymer structure 72 may be fractured, thus rupturing the microcapsules 74 and releasing the resin 78 to form a resin rich work surface to which another structure may be joined, with or without additional adhesives.

Accordingly, the disclosed joining surface may provide for a composite structure or polymer structure which upon a selected surface preparation may intentionally fracture a plurality of embedded resin filled microcapsules that form a cured and uncured work surface to which a secondary structure of various materials may be joined.

Although various aspects of the disclosed composite joining system and method have been shown and described, modifications may occur to those skilled in the art upon reading the specification. The present application includes such modifications and is limited only by the scope of the claims.

What is claimed is:

1. A composite joining system comprising:
   a composite structure comprising at least one ply, said composite structure further comprising a work surface;
   a peel ply applied to said work surface, said peel ply comprising:
   a fabric;

a resin medium infused with said fabric; and
a plurality of microcapsules embedded within said fabric and said resin medium, each of said plurality of microcapsules being filled with a joining material,
wherein said peel ply and said composite structure are at least partially co-cured, and
wherein at least a portion of said plurality of microcapsules fracture and release said joining material in response to separation of said peel ply from said composite structure.

2. The composite joining system of claim 1 wherein said composite structure further comprises a resin rich work surface following separation of said peel ply from said composite structure, and wherein said resin rich work surface comprises uncured joining material.

3. The composite joining system of claim 1 wherein said joining material is a resin.

4. The composite joining system of claim 1 wherein said peel ply comprises an outer surface interfaced with said work surface, and wherein said plurality of microcapsules are positioned proximate said outer surface of said peel ply.

5. The composite joining system of claim 1 wherein said plurality of microcapsules is uniformly dispersed through said fabric and said resin medium of said peel ply.

6. The composite joining system of claim 1 wherein each of said plurality of microcapsules comprises an outer wall enclosing said joining material.

7. The composite joining system of claim 6 wherein said outer wall of each of said plurality of microcapsules comprises a polymerization agent.

8. The composite joining system of claim 6 wherein said outer wall of each of said plurality of microcapsules comprises a material to toughen said joining material.

9. The composite joining system of claim 1 wherein said joining material comprises a flowable polymerizable resin.

10. The composite joining system of claim 2 further comprising a secondary structure applied to said resin rich work surface, wherein said composite structure and said secondary structure are co-cured.

11. The composite joining system of claim 10 further comprising a layer of adhesive applied between said composite structure and said secondary structure.

12. A composite joining system comprising:
a composite structure comprising at least one ply, said at least one ply comprising a plurality of reinforcement fibers embedded with a resin medium, said composite structure further comprising an outer surface;
a plurality of microcapsules embedded within said resin medium proximate said outer surface, each microcapsule of said plurality of microcapsules is filled with resin,
wherein at least a portion of said plurality of microcapsules fracture and release said resin to form a resin rich outer surface of said composite structure in response to removal of a portion of said outer surface.

13. The composite joining system of claim 12 further comprising a secondary structure applied to said resin rich outer surface, wherein said composite structure and said secondary structure are co-cured.

14. The composite joining system of claim 12 wherein said portion of said outer surface of said composite structure is removed by one of etching or abrasive blasting.

15. The composite joining system of claim 12 further comprising a peel ply co-cured to said outer surface of said composite material, wherein separation of said peel ply from said composite structure removes said portion of said outer surface.

16. The composite joining system of claim 12 wherein each microcapsule of said plurality of microcapsules comprises an outer wall enclosing said resin.

17. The composite joining system of claim 16 wherein said outer wall of each of microcapsule comprises at least one of a polymerization agent and a material to toughen said resin.

18. The composite joining system of claim 12 wherein said resin comprises a flowable polymerizable material.

* * * * *